United States Patent [19]
Cho

[11] Patent Number: 5,190,020
[45] Date of Patent: Mar. 2, 1993

[54] AUTOMATIC CONTROL SYSTEM FOR IC ENGINE FUEL INJECTION

[76] Inventor: Dong-Il D. Cho, 3 Rosewood Ct., Princeton Junction, N.J. 08550

[21] Appl. No.: 722,546

[22] Filed: Jun. 26, 1991

[51] Int. Cl.$^5$ .............................................. F02D 41/14
[52] U.S. Cl. .................................... 123/684; 123/478
[58] Field of Search ............... 123/478, 480, 489, 494, 123/681, 684; 364/431.05

[56] References Cited

U.S. PATENT DOCUMENTS

| | | | |
|---|---|---|---|
| 4,205,377 | 5/1980 | Oyama et al. | 123/489 X |
| 4,210,114 | 7/1980 | Watanabe | 123/489 |
| 4,481,929 | 11/1984 | Hasegawa | 123/489 X |
| 4,727,844 | 3/1988 | Morita et al. | 123/478 X |
| 4,864,998 | 9/1989 | Onishi | 123/489 |
| 4,869,222 | 9/1989 | Klassen | 123/489 |
| 4,869,223 | 9/1989 | Shimomura et al. | 123/489 |
| 5,007,399 | 4/1991 | Nakaniwa | 123/489 |
| 5,050,560 | 9/1991 | Plapp | 123/489 X |

OTHER PUBLICATIONS

D. Cho and J. K. Hedrick, "A Nonlinear Controller Design Method for Fuel-Injected Automotive Engines", Jul. 1988, vol. 110/313, Journal of Engineering for Gas Turbines and Power.

*Primary Examiner*—Willis R. Wolfe
*Attorney, Agent, or Firm*—Venable, Baetjer and Howard

[57] ABSTRACT

An automatic control method and system for internal combustion (IC) engines fuel injection systems are described. This automatic control method is a nonlinear and global method, that applies directly to automotive engines whose dynamics are highly nonlinear and complex, in the global sense to all internally and externally changing operating and environmental conditions for all transients and quasi-steady-state operations. Furthermore, the automatic control method is robust to unmodeled dynamics and disturbances. The automatic control method consists of estimating or measuring the mass rate of air entering the combustion chambers of an engine, estimating or calculating its time rate of change, and applying prescribed closed loop feedback correction term. In this fuel injection control method, the current mass rate of fuel command is the sum of the previously commanded fueling rate, plus the dynamic correction term according to the change in the mass rate of air entering combustion chambers multiplied by the elapsed time duration between the two injection commands and divided by a desired air to fuel ratio, plus the sensor based feedback correction term specially structured to automatically adjust in accordance with the amount of mass rate of air entering combustion chambers and its time rate of change, and to automatically adapt to the changes in both external and internal conditions. The resulting system can provide stability robustness properties and optimal regulation of desired air to fuel ratio globally for the entire operating range of IC engines.

4 Claims, 13 Drawing Sheets

Flow Chart Comments 1,3) MAP sensor is read continuously for one-half of a revolution of the crank shaft and averaged to eliminate pressure fluctuations due to the induction process from other cylinders.

2) Engine speed is calculated from the crank angle rotation divided by the elapsed time, which is measured from counting pulses of a counter/timer chip on the computer.

4) $m_a$ (total air mass in the intake manifold) is calculated using the Ideal Gas law and the signals from the MAP and MAT sensors.

5 &6) A single values of $\hat{m}_{ao}(t)$ (the time rate of change of the mass air flow rate entering the cylinder) is calculated via numerical differencing. The absolute value of $abs(\hat{m}_{ao}(t))$ used in feedback gain is averaged to smooth out noise. Normal or non-absolute values of $\hat{m}_{ao}(t)$ are also time-moving-averaged. Throttle change is added to both averaging to compensate for the averaging time lag.

*Fig. 9*

AUTOMATIC CONTROL SYSTEM FOR IC ENGINE FUEL INJECTION

FIELD OF INVENTION

This invention relates to microcomputer controlled fuel injection systems for internal combustion (IC) engines and, more particularly, to a methodology of calibrating such engines' operating characteristics and constructing microcomputer based automatic control systems that monitor and control the air to fuel ratio for optimal performance, driveability, and emission characteristics, and that automatically adapt to changing internal and external conditions.

BACKGROUND OF THE INVENTION

Electronic and microprocessor feedback control for automotive systems are seeing increasing attention. The interest in feedback control systems stems from the availability of powerful but inexpensive microprocessors that enable real time performance and efficiency monitoring and control. The most common example may be found in automotive fuel injection systems, which have found a widely accepted use in many IC engine applications.

The goal of a control system is to affect the output of physical systems in desired manners and/or to achieve certain tasks, using available control inputs to physical systems. A control system can be broken into two categories: open loop systems and closed loop (or feedback) systems. FIG. 1 depicts a generic diagram of an open loop control system. The control input 50 is used to impart forces or effects on the physical system 51, whose dynamics are described by a mathematical input-output relationship or model H, so that desired dynamic behavior of the output 52 can be achieved. The design method of control input function is simply computing the inverse of the model H (i.e., $H^{-1}$) and multiplying it by the time history of the desired output. This type of open loop control system is commonly used for many real engineering systems, including automotive carburetors, various manufacturing processes, and space shuttle trajectory calculation. The problems associated with this approach are the fact that no mathematical model of a physical system is one hundred percent accurate and the fact that almost all physical systems are affected by unknown disturbances. FIG. 2 depicts a generic diagram illustrating these problems. Since the actual model relationship H cannot be determined, only the best estimate of the model H is available for the purpose of designing the control input 60. Since the actual model H comprises the best model estimate H and the modeling error dH, the control input 60 affects both blocks 61 and 63. Then, the actual output 64 will comprise of both the control input multiplied by the model 61 and modeling error 63, and thus, the output will be quite different than the desired output. Furthermore, the disturbance d also affect the whole system and particularity the output 64. In fact the modeling error 63 and the disturbance 62 can be quite large and the output can deviate quite appreciably from their desired level, and in extreme cases, the modeling error 63 and the disturbance 62 can destabilize the actual physical system. Therefore, the open loop control scheme discussed heretofore is not a robust method of controlling a physical system.

The application of feedback or closed loop control can remedy this problem. FIG. 3 depicts a generic schematic diagram of a feedback control system. Since the output signal 72 contains information of both disturbance and modeling errors, it can be used to affect the input signal to the physical system so that a desired output can be obtained. This is done dynamically and automatically by the control electronics and/or software contained in a microcomputer 71. Then, the control input is automatically adjusted according to varying output and disturbance conditions via the feedback path 70, so that a desired output can be achieved at all times even in the presence of modeling errors and disturbances.

The objective of automotive fuel control systems is to control the air to fuel ratio entering the combustion chamber, so that proper combustion can take place. Since the amount of fuel entering the intake manifold and subsequently the combustion chamber is controlled by the throttle actuated by the driver (or by the cruise control actuator), the object is to determine the rate of air entering the combustion chamber, determine the corresponding intake valve open duration as a function of engine speed, and spray the proper amount of fuel.

Two common methods exist for determining the rate of air entering combustion chambers. The first of the two methods is the speed-density method, and a typical embodiment of this method is depicted in FIG. 4. The best estimate of the mass rate of air $m_{ao}$ entering the combustion chamber is determined by knowing the density of air in the intake manifold 81, the total volume of the air in the intake manifold, the engine speed 82, and calibrated data of physical transfer characteristics between the intake manifold piping and valves and the combustion chamber 83 (known as the volumetric efficiency). The total mass of air in the intake manifold is determined from signal outputs from the manifold absolute temperature (MAT) sensor 84 and the manifold absolute pressure (MAP) sensor 85 as is known in the art. The volumetric efficiency function is a measure of the efficiency of an engine's induction system and is defined as the actual volume entering the combustion chamber 83 divided by the actual physical volume displaced by the piston 88. The volumetric efficiency is a complex function of both intake and exhaust manifold ducting as well as the engine speed and the total pressure in the intake manifold. In general, analytic form of this function cannot be determined, and as a result, extensive calibration must be performed both statically on dynamometer and dynamically on vehicle. How and under what conditions to calibrate are determined heuristically, based on the experience of the design engineer, and a large number (a few hundred to a few thousand) of datum points are generated. The table of datum points are stored in the engine control module (ECM) 86 that contains one or more microcomputers. The desired fuel injection rate is calculated by the ECM 86, and the calculated fuel injection rate is commanded to the fuel injector 87.

The inaccuracies and noise associated with the engine speed sensor 82, MAT sensor 84, and MAP sensor 85, as well as unavoidable errors in calibrating the volumetric efficiency function will result in poor control of air to fuel ratio. The oxygen sensor 89 located at the exhaust manifold 90 is used to compensate the modeling and sensor inaccuracies. The oxygen sensor detects the presence of oxygen in the exhaust gas and outputs a high voltage when the intake air to fuel mass ratio is lower (or richer) than the stoichiometric ratio of 14.64:1, and a low voltage when the intake air to fuel mass ratio is higher (or leaner) than the stoichiometric ratio. The oxygen sensor characteristics are largely binary, rather than continuous, as depicted in FIG. 5. In addition, the sensor output voltages vary significantly with the exhaust gas temperature. Therefore, the oxygen sensor 89 is not an ideal sensor for feedback control. However, the oxygen sensor 89 is the most common feedback sensor, because the cost of continuous range sensors is prohibitive for automotive applications. Furthermore, the oxygen sensor output lags the actual air to fuel ratio information to be controlled by two engine revolutions, time for air to travel down the exhaust pipe to reach the oxygen sensor, and the physical time lag associated with the sensor itself. As a result of the imperfect feedback sensor, existing feedback control theories cannot be used to determine the structure or the gains of the feedback controller that needs to be implemented in the ECM 86. Therefore, heuristic means of determining the controller structure and calibrating the feedback gains are used, and in general a large number (a few hundred to a few thousand) of feedback gains must be calibrated through a trial and error process for every different automobile system. Therefore, IC engine fuel injection control systems are a collection of numerous control schemes designed for very specific operating conditions and a heuristically determined method of scheduling when to switch to different schemes. How and under what conditions to calibrate as well as when to switch to different control schemes is determined heuristically, based on the experience of the design engineer.

The second of the two popular methods is the mass air flow meter (MAFM) method, and a typical embodiment of this method is depicted in FIG. 6. The best estimate of the mass rate of air $m_{ao}$ entering the combustion chamber is determined by measuring the mass rate of air $m_{ai}$ entering the intake manifold. The mass rate of air $m_{ai}$ entering the intake manifold is measured by the use of the mass air flow meter 102 located near the entrance of the intake manifold. While this MAFM method is more straightforward than the previously described speed-density method, the MAFM method is generally more expensive due to the relatively high cost of the MAFM sensor 102. The best estimate of the mass rate of air $m_{ao}$ entering the combustion chamber is the mass rate of air $m_{ai}$ entering the intake manifold delayed by the time constant of the MAFM sensor itself and the time constant associated with filling and emptying the intake manifold. The time constant associated with filling and emptying the intake manifold may be ignored, or for better control accuracy, may be estimated as a function of the intake manifold temperature and pressure conditions, the engine speed, and the volumetric efficiency function. If this second option is used the engine speed sensor 82, the MAT sensor 84, and the MAP sensor 85 of the speed-density method embodiment discussed in FIG. 4 must also be used. As in the speed-density method, the desired fuel injection rate in the MAFM method is calculated by the ECM 105, and the calculated fuel injection rate is commanded to the fuel injector 106.

The inaccuracies and noise associated with the MAFM sensor 102, as well as in calculating the mass rate of air $m_{ao}$ entering the combustion chamber from the mass rate of air $m_{ai}$ entering the intake manifold, will result in inaccurate control of air to fuel ratio. The oxygen sensor 107 at the exhaust manifold 108 is used to compensate the modeling and sensor inaccuracies as in the speed-density method previously described. The problems and requirements associated with the use of oxygen sensor 107 for feedback control and the need for using heuristic means for determining the controller structure, calibrating the feedback gains, and scheduling the gains are the same as previously described in the speed-density method.

In both the speed density method or the mass air flow meter method, determining the structure and gains of the fuel injection controller is extremely difficult and time consuming. Gain and event scheduling is an art known to a very few. Furthermore, because of the heuristic approach combined with trial and error process employed in developing fuel injection controllers, the performance levels are always sub-optimal, and the algorithms are not robust to conditions that are not considered in the development process.

A nonlinear fuel injection controller design methodology that is globally effective (rather than locally controlled and gain and event scheduled scheduled as described heretofore) is also known and is detailed in "A Nonlinear Controller Design Method for Fuel-Injected Automotive Engines", Cho and Hedrick, Transactions of the ASME, Journal of Engineering for Gas Turbines and Power, Volume 110, July 1988, and in "Sliding Mode Fuel Injection Controller: Its Advantages", Cho and Hedrick, presented at the ASME Winter Annual Meeting, Chicago, December 1988, and to be published in the Transactions of the ASME, Journal of Dynamic Systems, Measurement and Control, September 1991. However, the nonlinear controller or sliding mode controller methodology described by Cho and Hedrick (both references) has a significant problem that makes it impractical for implementation. Specifically, the methodology requires the knowledge of the actual amount of fuel entering combustion chambers at a given time; this is necessary because of the fuel delivery dynamics, the actual amount of fuel entering combustion chambers is not identical to the amount of fuel being sprayed by the fuel injector. This information can be obtained in two ways. The first is to install a sensor that can measure the actual amount of fuel entering combustion chambers; this type of sensors are typically very expensive, and thus, automotive applications of this type of sensors is impractical. The second is to analytically estimate the actual amount of fuel entering combustion chambers; this can be accomplished by observer or filter techniques. However, a closed loop observer or filter cannot be constructed because the inability to use feedback sensors for the same reasons as the first alternative. The use of open loop observers or filters is prohibitive because of the robustness problems associated with such configurations; this problem is analogous to the robustness problems of open loop controllers described previously in FIGS. 1 and 2.

Accordingly, it is an object of this invention to provide methodologies for implementing the nonlinear global control system for automotive fuel injection systems, so to overcome the difficulties, poor performance, and costly development associated with the conventional, event and gain scheduled linear local control systems used in current IC engines and to overcome the difficulties and problems associated with the nonlinear or sliding mode automotive fuel injection controller design method disclosed by Cho and Hedrick.

Is a further object of this invention to provide methods of designing designing automotive fuel injection controllers that are robust, i.e., maintain the system stability, even under severe operating conditions and in the presence of modeling and estimation errors and sensor noise.

It is still another object of this invention to provide methods of designing automotive fuel injection controllers that are globally effective, with the feedback gains automatically adjusting to varying driver commands and changing environmental conditions, thus eliminating the need to extensively gain and event schedule numerous local controllers. Hence, the new method is much easier and less time consuming to calibrate, tune, and develop than any previously known methods.

It is still another object of this invention to provide methods of designing automotive fuel injection controllers that are optimal for a given set of sensors, system parameters, and system models.

SUMMARY OF THE INVENTION

An automatic control method and system for internal combustion (IC) engines fuel injection systems are described. This automatic control method is a nonlinear and global method, that applies directly to automotive engines whose dynamics are highly nonlinear and complex, in the global sense to all internally and externally changing operating and environmental conditions for all transients and quasi-steady-state operations. Furthermore, the automatic control method is robust to unmodeled dynamics and disturbances. The automatic control method consists of estimating or measuring the mass rate of air entering the combustion chambers of an engine, estimating or calculating its time rate of change, and applying prescribed closed loop feedback correction term. In this fuel injection control method, the current mass rate of fuel command is the sum of the previously commanded fueling rate, plus the dynamic correction term according to the change in the mass rate of air entering combustion chambers multiplied by the elapsed time duration between the two injection commands and divided by a desired air to fuel ratio, plus the sensor based feedback correction term specially structured to automatically adjust in accordance with the amount of mass rate of air entering combustion chambers and its time rate of change, and to automatically adapt to the changes in both external and internal conditions. The resulting system can provide stability robustness properties and optimal regulation of desired air to fuel ratio globally for the entire operating range of IC engines.

BRIEF DESCRIPTION OF THE DRAWING

FIGS. 9, 9A, 9B and 9C are detailed flow charts of the algorithms of a system to perform the invention hereof.

DETALED DESCRIPTION OF THE INVENTION

Figure 1:
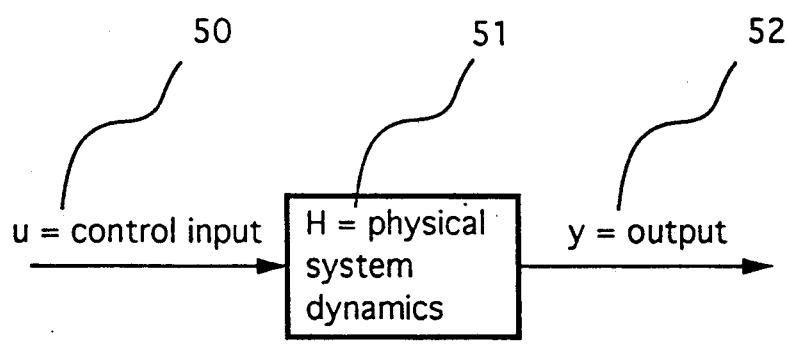
FIG. 1 is a high level block diagram of a generic control system.
Figure 2:
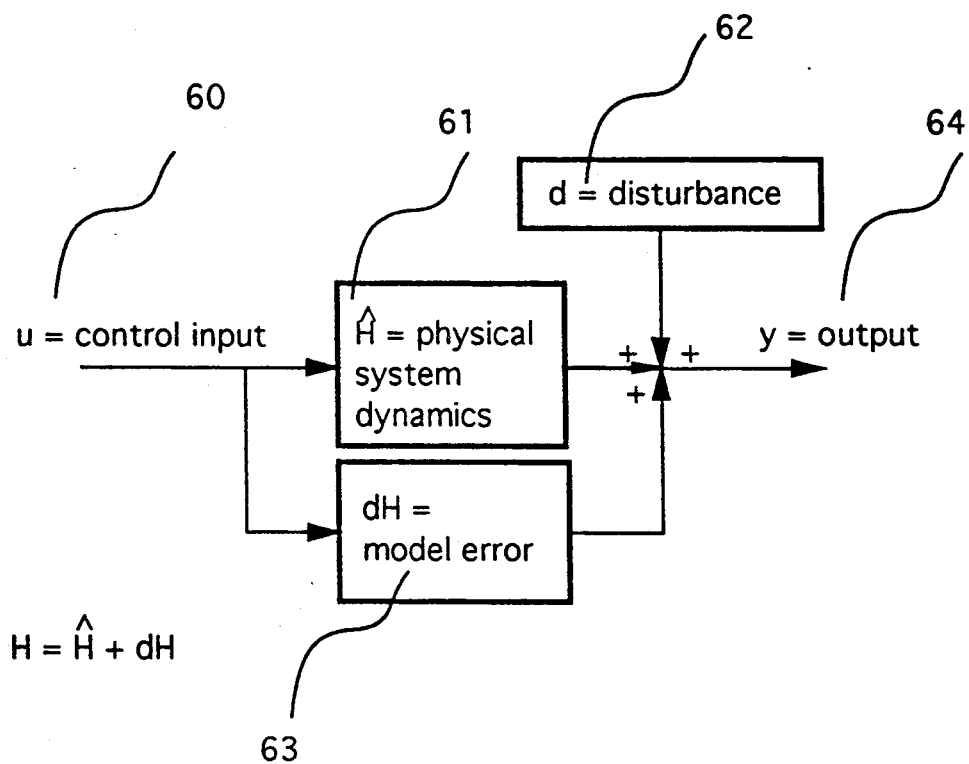
FIG. 2 is a high level block diagram illustrating the problems associated with a generic open loop control system.
Figure 3:
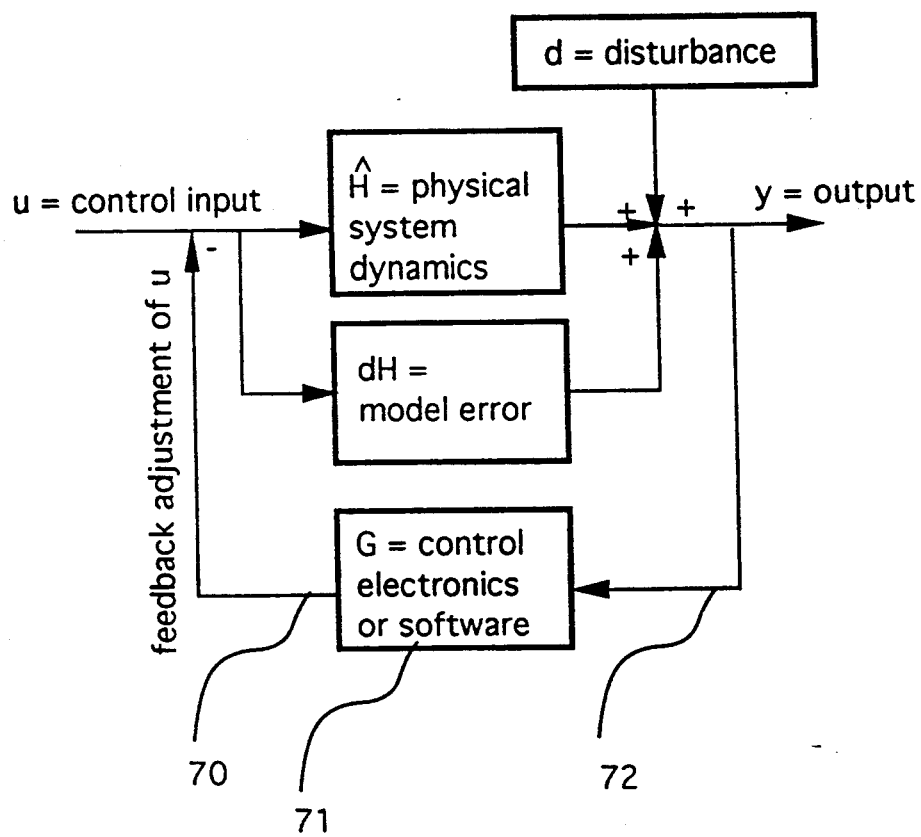
FIG. 3 is a high level block diagram of a generic closed loop control system.

Prior to describing the details of this invention, below is the listed terminology which will be used hereinafter:

$$\dot{(\ )} = \frac{d(\ )}{dt} = \text{first time derivative } (\ )$$

$$\ddot{(\ )} = \frac{d^2(\ )}{dt^2} = \text{second time derivative of } (\ )$$

$\hat{(\ )}$ = model of best estimate of ( )
abs ( ) = absolute value of ( )
a = positive constant
$\alpha$ = positive constant less than 1; $0 < \alpha < 1$
$\beta$ = desired air to fuel ratio
c = positive constant $\Delta t$ = time delay for intake to oxygen sensor output
 = intake to exhaust delay + time for exhaust gas to travel down the exhaust pipe to the oxygen sensor + sensor time delay $\phi$ = modeling error in fuel delivery dynamics
$\gamma$ = feedback gain, positive, adjusts automatically to external and internal conditions
$\eta$ = feedback gain, positive constant
$I_c$ = effective engine inertia
$\mu$ = modeling error for $m_{ao}$
$m_a$ = total mass of air in the intake manifold
$m_{ai}$ = mass rate of air entering intake manifold
$m_{ao}$ = mass rate of air exiting intake manifold and entering combustion chamber
$m_{fc}$ = commanded mass rate of fuel
$m_{fo}$ = mass rate of fuel exiting intake manifold and entering combustion chamber
S = manifold defined in multi-dimensional state space $$\text{sgn}(\ ) = \begin{cases} 1 \text{ if } (\ ) \geq 0 \\ -1 \text{ if } (\ ) < 0 \end{cases}$$

t = time
$T_{brake}$ = engine brake torque
$T_{load}$ = engine load torque
$\tau_f$ = fuel delivery time constant between commanded rate and intake manifold exiting rate, changes with internal and external conditions
$V(O_2)$ = voltage output of oxygen sensor in millivolts
$\omega_c$ = engine speed In order to describe the nonlinear, global, and automatic fuel injection controller design methodology, which is the subject of this invention, it is necessary to first describe the mathematical model of an automotive engine. The three state engine model below is from "Sliding Mode Fuel Injection Controller: Its Advantages", Cho and Hedrick, presented at the ASME Winter Annual Meeting, Chicago, December 1988, and to be published in the Transactions of the ASME, Journal of Dynamic Systems, Measurement and Control, September 1991:

$$m_a(t) = m_{ai}(m_a, t) - m_{ao}(m_a, \omega_c, t) \quad (1)$$

$$\omega_e(t) = \frac{1}{I_c}[T_{brake}(m_a, \omega_e, m_{fo}, t) - T_{load}(t)] \quad (2)$$

$$m_{fo}(t) = \frac{1}{\tau_f(m_a, \omega_c, t)}[-m_{fo}(t) + m_{fc}(t)] \quad (3)$$

The objective of fuel injection control system in general is to control the ratio of the mass rate of air $m_{ao}$ exiting intake manifold and entering combustion chambers to the mass rate of fuel $m_{fo}$ exiting intake manifold and entering combustion chamber at a desired ratio of $\beta$, or:

$$m_{ao}(t):m_{fo}(t) = \beta:1 \text{ for a given intake duration} \quad (4)$$

Equivalently, the fuel injection control objective is to make S=0, where:

$$S(t) = m_{ao}(t) - \beta m_{fo}(t) \text{ for a given intake duration} \quad (5)$$

In equation (5), S(t)=0 defines a manifold in the multi-dimensional state space; On the S(t)=0 manifold, the air to fuel ratio is the desired value $\beta$:1. The S(t)=0 surface is an "attractive" surface, if $S(t)\dot{S}(t)$ is less than zero. This can be easily seen as follows: if S(t) is positive then $\dot{S}(t)$ is negative, which will reduce S(t) toward zero; conversely, if S(t) is negative then $\dot{S}(t)$ is positive, which will increase S(t) toward zero. Furthermore, it is desired that $\dot{S}(t)$ is more negative when S(t) is a large positive number, so to increase the speed at which S(t) approaches zero, and when S(t) is less negative when S(t) is a small positive number, so to reduce the potential for overshooting the S(t)=0 manifold. One possible way to accomplish this is by choosing a feedback control law that provides control action as a function of S(t) to accomplish:

$$S(t)\dot{S}(t) = -\eta \text{abs}(S(t)) \quad (6)$$

or equivalently:

$$\dot{S}(t) = -\eta \text{sgn}(S(t)) \quad (7)$$

Substituting the definition of S(t) in equation (5) into the control requirement in equation (7):

$$\dot{S}(t) = \dot{m}_{ao}(t) - \beta \dot{m}_{fo}(t) = -\eta \text{sgn}(S(t)) \quad (8)$$

Substituting the fuel dynamics in equation (3) into equation (8):

$$\dot{S}(t) = \dot{m}_{ao}(t) - \frac{\beta}{\tau_f(t)}[-m_{fo}(t) + m_{fc}(t)] = -\eta \text{sgn}(S(t)) \quad (9)$$

Rearranging equation (9) for the control variable $m_{fc}(t)$:

$$m_{fc}(t) = m_{fo}(t) + \frac{\tau_f(t)}{\beta}[\dot{m}_{ao}(t) + \eta \text{sgn}(S(t))] \quad (10)$$

The control law of equation (10) is the nonlinear controller for fuel injection systems of IC engines, and can globally control the air to fuel ratio for all operating conditions of IC engines. The fuel command rate $m_{fc}(t)$ in equation (10) is comprised of three terms. The first term $m_{fo}(t)$ is the mass rate of fuel actually entering the combustion chamber, and the second term $$\frac{\tau_f(t)}{\beta} \dot{m}_{ao}(t)$$

is the rate of change of mass rate of air actually entering the combustion chamber multiplied by the fuel delivery time constant $\tau_f(t)$ and divided by the desired air to fuel ratio $\beta$. These first two terms are the dynamic model based open loop fuel command rate. The third term associated with sgn(S(t)) is the closed loop fuel command rate based on the feedback signal S(t), which is $m_{fo}(t) - \beta m_{ao}(t)$. The nonlinear global controller in equation (10) was disclosed by Cho and Hedrick.

Figure 5:
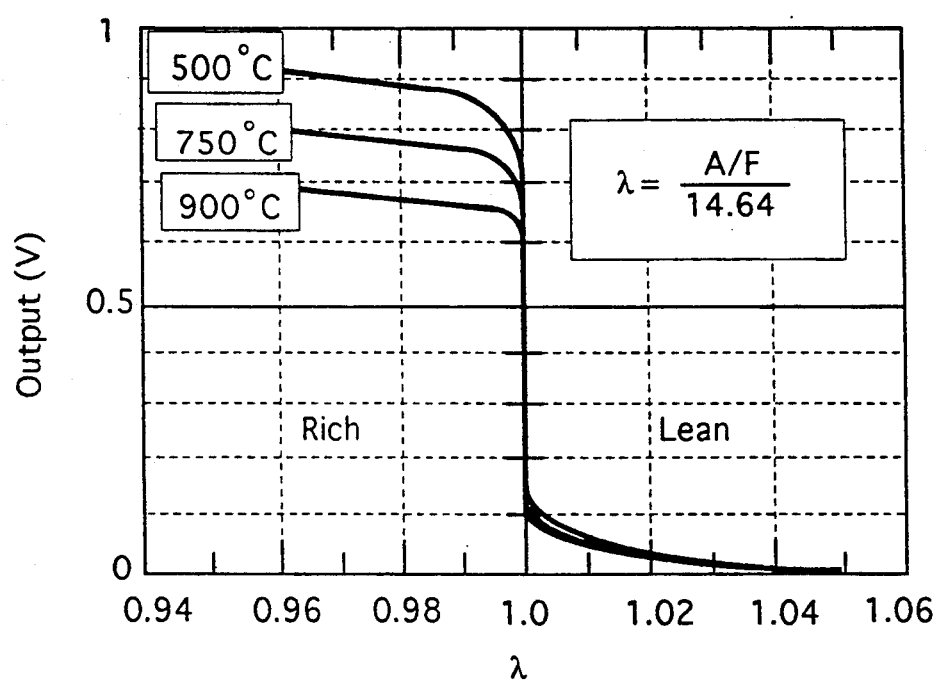
FIG. 5 depict the operating characteristics of a prior art oxygen sensor.

The nonlinear global controller in equation (10) has two major problematic issues, which are also disclosed by Cho and Hedrick in the previously referenced papers. The first issue concerns the need to use the actual air to fuel ratio at the inlet to the combustion chamber in sgn(S(t)), which cannot be obtained easily. This problem can be ameliorated by the use of the output signal from the oxygen sensor located at the exhaust system. Referring to FIG. 5, the oxygen sensor signal is larger than 600 millivolts when the air to fuel ratio is richer than the stoichiometric ratio, and the oxygen sensor signal is less than 200 millivolts when the air to fuel ratio is leaner than the stoichiometric ratio. Therefore, the following relationship is established:

$$\text{sgn}(S(t)) = \text{sgn}[400 \text{ millivolts} - V(O_2(t+\Delta t))] \quad (11)$$

However, the oxygen sensor output at time $t+\Delta t$ is not available at time t. At time t, only the oxygen sensor output at that time $V(O_2(t))$ is available, which corresponds to the information of S at time $t-\Delta t$. Thus, the fuel injection controller configuration becomes:

$$m_{fc}(t) = m_{fo}(t) + \frac{\tau_f(t)}{\beta}[\dot{m}_{ao}(t) + \eta \text{sgn}[400 - V(O_2(t))]] \quad (12)$$

The above referenced papers revealed that the use of the time delayed information in the feedback signal results in slightly degraded performance levels, but the closed loop stability can be maintained.

The second problem associated with the nonlinear controller in equation (10) or (12) is more problematic than the first one, and it severely hinders implementing the nonlinear controller disclosed by Cho and Hedrick. Since the actual values of the first two terms in equation (12) are neither precisely known nor can be measured exactly, only the best estimate can be implemented as follows:

$$\hat{m}_{fc}(t) = \hat{m}_{fo}(t) + \frac{\hat{\tau}_f(t)}{\beta}[\hat{\dot{m}}_{ao}(t) + \eta \text{sgn}[400 - V(O_2(t))]] \quad (13)$$

It is possible to estimate the time rate of change of the mass rate of air $\dot{m}_{ao}(t)$ entering combustion chambers and the fuel delivery time constant $\tau_f(t)$ in the known manner, but estimating or measuring the actual mass rate of fuel $m_{fo}(t)$ entering the combustion chamber cannot be done in a robust manner. The previously referenced papers by Cho and Hedrick attempted a solution to the problem of estimating the variable $m_{fo}(t)$ by the use of an open loop observer, using equation (3) and suggested that the following set of equations be implemented for the fuel injection controller:

$$\dot{m}_{fo}(t) = \frac{1}{\tau_f(t)} [-m_{fo}(t - t_k) + m_{fc}(t - t_k)] \quad (14)$$

$$m_{fo}(t) = m_{fo}(t - t_k) + t_k \times \dot{m}_{fo}(t) \quad (15)$$

$$m_{fc}(t) = m_{fo}(t) + \frac{\tau_f(t)}{\beta} [m_{ao}(t) + \eta \operatorname{sgn}[400 - V(O_2(t))]] \quad (16)$$

Equation (15) is the backward Euler integration method for numerically integrating a differential equation, and a number of other well known numerical integration schemes may also be used. The control method in equations (14)–(16), however, cannot be implemented in a robust fashion because of the following: estimating the actual mass rate of fuel $m_{fo}(t)$ entering the combustion chamber by an open loop method by a straightforward integration as in equations (14) and (15) is very sensitive to bias errors that can result from a number of number of sources, including the sensor noise and modeling errors in calculating $$\frac{\tau_f(t - t_k)}{\beta} m_{ao}(t - t_k)$$

necessary in computing $m_{fc}(t - t_k)$ in equation (14), as well as the mismatched conditions in the very first step of calculating $m_{fo}(0)$ for equation (15) at $t = 0$. Furthermore, these non-trivial and non-negligible errors and noise are compounded as the fuel injection control equations (14)–(16) are propagated in time, which results in the instability and possible catastrophic failure of the control system. In addition, it should be noted that the mathematical model of the engine system given in equations (1)–(3) are only simplified mathematical expressions of an engine system devised to facilitate controller designs. It should also be noted that the nonlinear fuel injection controller derivation in equations (4)–(16) assumes that the structure of the mathematical engine model in equations (1)–(3) are true of the physical engine, which is not true. For example, the fuel delivery dynamics of the conventional fuel systems are typically modeled as a first order time lag in equation (3), but the actual fuel delivery dynamics consist of fast gaseous mode of atomized fuel and slow liquid mode of non-atomized fuel. The split ratio between the liquid and gas phases varies in accordance with operating conditions of engines as well as the environmental conditons and fuel characteristics. As a result of these modeling assumptions and resulting rather significant errors, the controller scheme in equations (14)–(16) is not robust and cannot be successfully implemented on a physical engine and expected to provide good performance levels.

To remedy the robustness problems associated with the need to obtain the mass rate of fuel actually entering combustion chambers that prohibits successful implementation of the method disclosed by Cho and Hedrick, the fuel delivery model is neglected and a new engine model is used in the subject invention. Then, $$m_{fc}(t) = m_{fo}(t) \text{ and } \dot{m}_{fc}(t) = \dot{m}_{fo}(t) \quad (17)$$

The objective of the fuel injection control system of the subject invention is to control the air to fuel ratio at some desired value $\beta$, which may vary with time and driving conditions. The controller objective is $S(t) = 0$, where:

$$S(t) = m_{ao}(t) - \beta m_{fc}(t) \quad (18)$$

As before, achieve the attraction of $S(t) = 0$ manifold by:

$$\dot{S}(t)(t) = -\eta \operatorname{sgn}[400 - V(O_2(t))]$$

or $\dot{m}_{ao}(t) - \beta \dot{m}_{fc}(t) = -\eta \operatorname{sgn}[400 - V(O_2(t))] \quad (19)$ Rearranging equation (19) for the control variable $\dot{m}_{fc}(t)$:

$$\dot{m}_{fc}(t) = \frac{1}{\beta} [\dot{m}_{ao}(t) + \eta \operatorname{sgn}[400 - V(O_2(t))]] \quad (20)$$

The actual fuel command rate is then:

$$m_{fc}(t) = m_{fc}(t - t_k) + t_k \times \dot{m}_{fc}(t) \quad (21)$$

which may be rewritten with equation (20) as given below:

$$m_{fc}(t) = m_{fc}(t - t_k) + t_k \times \frac{1}{\beta} [\dot{m}_{ao}(t) + \eta \operatorname{sgn}[400 - V(O_2(t))]] \quad (22)$$

The nonlinear fuel injection controller in equation (22) provides global control for all operating conditions of IC engines, but it does not suffer from the robustness problems that can drive the previously described controller in equations (14)–(16) disclosed by Cho and Hedrick unstable. One of the major problems of the controller in equations (14)–(16) is that associated with estimating the value of the mass rate of fuel $m_{fo}(t)$ actually entering combustion chamber by numerically integrating the simplified mathematical model in an open loop fashion. The need for estimating $m_{fo}(t)$ is completely eliminated in controller described by equation (22) in the subject invention. Hence, the fuel injection controller described by equation (22) is a robust methodology of implementing a nonlinear global fuel injection control system for IC engines.

In addition to the above discussed global control advantages, the structure of the fuel injection controller described by equation (22) is also well suited for IC engines. The current mass rate of fuel signal to fuel injectors is the sum of previously outputted signal, plus the dynamic correction according to the change in the mass rate of air entering combustion chambers multiplied by the elapsed time duration between the two injection commands and divided by the desired air to fuel ratio $$\frac{\dot{m}_{ao}(t)}{\beta} \times t_k,$$

plus the sensor based correction term due to imprecisions in the dynamic term calculations $$\frac{\eta \operatorname{sgn}[400 - V(O_2(t))]}{\beta} \times t_k,$$

In addition to the global control and structural advantages of the controller in equation (22) of the subject invention, physically implementing and determining its feedback gain $\eta$ for both optimal air to fuel ratio regulation and the stability of the closed loop system are straightforward, which remedies the problems associated with the ad-hoc gain calibration and gain and event scheduling necessary in the conventional methods. The term $\dot{m}_{ao}(t)$, which is the time rate of change of the mass air flow rate actually entering combustion chambers, is not known exactly, so only the estimate or model $\dot{m}_{ao}(t)$ can be implemented. Directly modeling $\dot{m}_{ao}(t)$ is a nontrivial task, and hence it is best that $\dot{m}_{ao}(t)$ is obtained from the model of $m_{ao}(t)$, or $m_{ao}(t)$. This approach has a further advantage in calibrating the feedback control gain $\eta$, which will be shown. The mass rate of air entering combustion chamber can be modeled or estimated in two popular ways (the speed-density method or the mass air flow meter method) as previously described. In either scenario, the estimated or modeled quantity $m_{ao}(t)$ has a combined modeling and measurement error such that:

$$m_{ao}(t) = (1 + \mu(t))m_{ao}(t) \qquad (23)$$

Then, the time rate of change of $m_{ao}(t)$ is:

$$\dot{m}_{ao}(t) = \mu(t) + (1 + \mu(t))\dot{m}_{ao}(t) \qquad (24)$$

Substituting equation (24) into equation (22):

$$m_{fc}(t) = m_{fc}(t - t_k) + t_k \times \qquad (25)$$

$$\frac{1}{\beta}[\mu(t)m_{ao}(t) + (1 + \mu(t))\dot{m}_{ao}(t) + \eta \text{sgn}[400 - V(O_2(t))]]$$

Since the error terms $\mu(t)$ and $\mu(t)$ cannot be known exactly, only the following equation can be physically implemented:

$$m_{fc}(t) = m_{fc}(t - t_k) + t_k \times \qquad (26)$$

$$\frac{1}{\beta}[\dot{m}_{ao}(t) + \gamma(t)\text{sgn}[400 - V(O_2(t))]]$$

It is straightforward to see that selecting the feedback control gain $\gamma(t)$ to be larger than:

$$\gamma(t) > \text{abs}(\phi(t)) + \text{abs}(\mu(t)m_{ao}(t)) + \mu(t)\text{abs}(\mu(t)m_{ao}(t)) \qquad (27)$$

guarantees the absolute stability of the $S(t) = 0$ manifold, and hence achieving the desired air to fuel ratio, even if the modeling errors and sensor noise combine in the worst possible manner, and under all engine operating conditions including rapid transients. In equation (27), $\phi(t)$ is the error associated with neglecting the fuel delivery dynamics, and $\mu(t)$ is the modeling or estimate error associated with $m_{ao}(t)$. It should be noted that the structure of the feedback gain $\gamma(t)$ in equations (26) and (27) is well suited for fuel injection systems. The third term $\text{abs}(\mu(t)m_{ao}(t))m_{ao}(t))$ is very small, when the engine operating conditions are fairly steady or quasi-steady-state. Thus, in quasi-steady-state, the first two terms $\text{abs}(\phi(t))$ and $\text{abs}(\mu(t)m_{ao}(t))$ dominate the feedback control action. The sum of the two terms also automatically vary with engine condition. For example, at higher engine speed, the mass rate of air entering combustion chambers and its estimate $m_{ao}(t)$ becomes large, which makes the closed loop system more stable at higher engine speed. As another example, at idle, the mass rate of air entering combustion chambers and its estimate $m_{ao}(t)$ is very small, which provides the ability to provide very tight air to fuel ratio fluctuations. During transients, the third term associated with the time rate of change of the mass rate of air entering combustion chambers or its estimate $\dot{m}_{ao}(t)$ dominate the control action, which provides an excellent means to provide stability as well as tight air to fuel control during transients. As a result, the feedback gain structure in equation (27) provides the complete means to easily tune and calibrate the controller gains with only a few constants. In addition, the controller structure in equation (26) with the feedback gain in equation (27) provide the complete means of proving global control for all operating conditions of IC engines, while providing the stability of the closed loop system robustness as well as the attractiveness of the $S(t) = 0$ manifold (or controlling air to fuel ratio at the desired levels). Therefore, in contrast to the conventional linear local controller methods described previously in FIGS. 4 and 6, the controller methodology described herewith provides the means of varying the feedback control gains automatically depending on all external and internal changes in operating conditions, hence, providing truly global control. Furthermore, by incorporating the amounts of modeling errors and sensor noise in the feedback gain parameter $\gamma(t)$, the stability robustness is provided for all operating conditions. In addition, by selecting the feedback gain parameter $\gamma(t)$ in accordance with the amounts of modeling errors and sensor noise, the optimal (or best) performance levels can be obtained for the given knowledge of the engine system and the sensors used in the control system.

Figure 4:
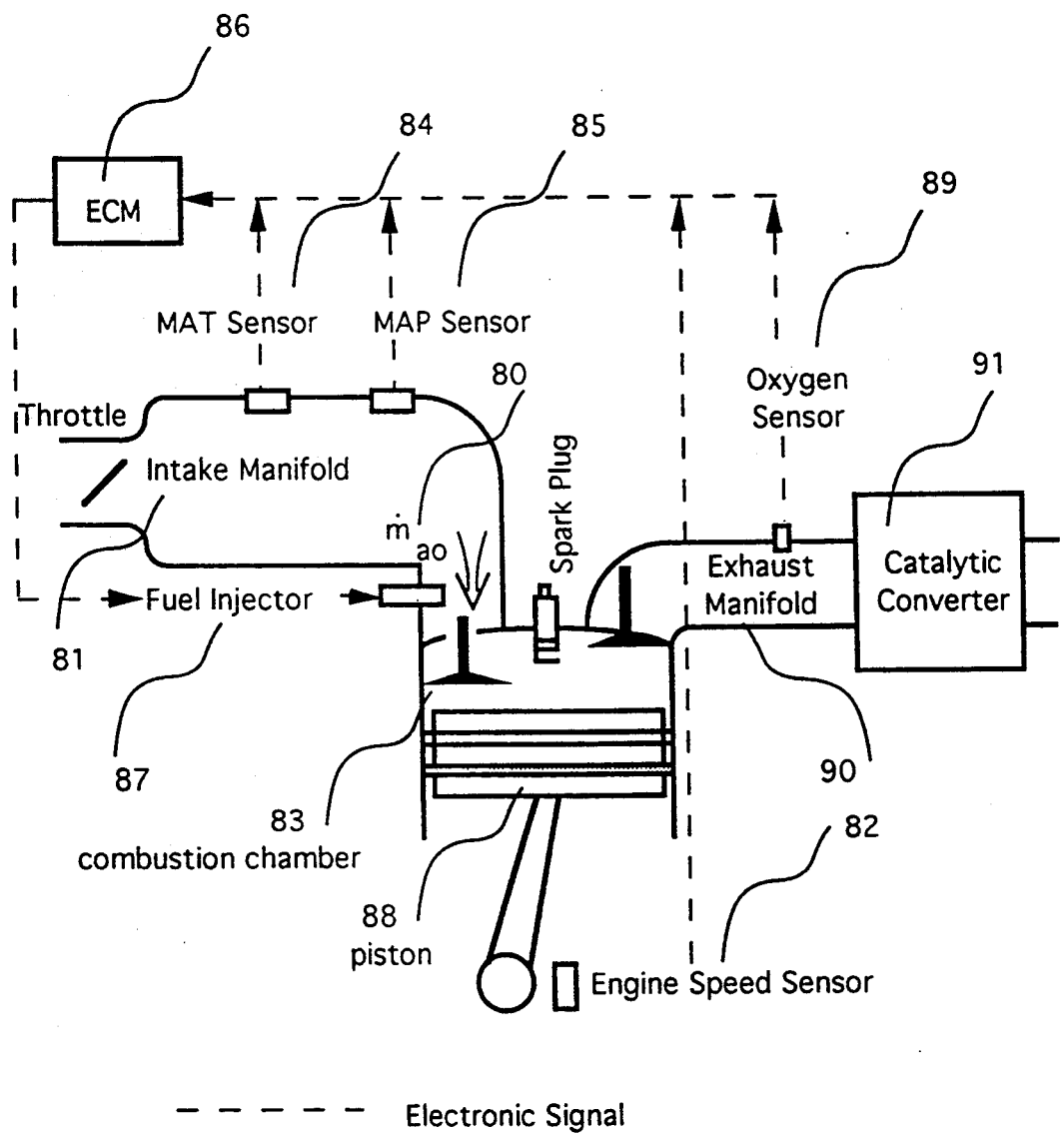
FIG. 4 is a functional block diagram of a prior art speed-density type fuel injection control system.
Figure 6:
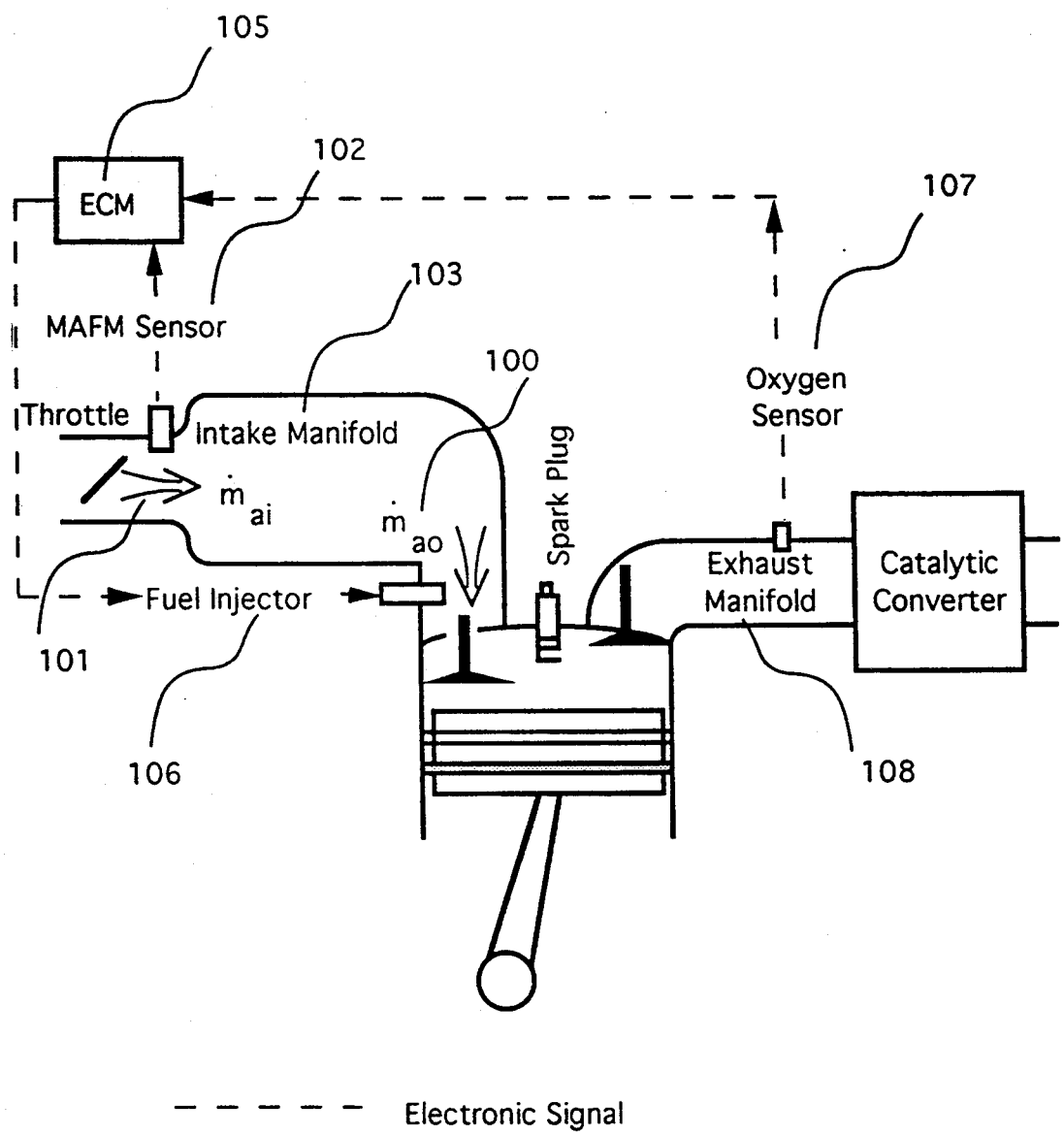
FIG. 6 is a functional block diagram of a prior art mass air flow metering type fuel injection control system.
Figure 7:
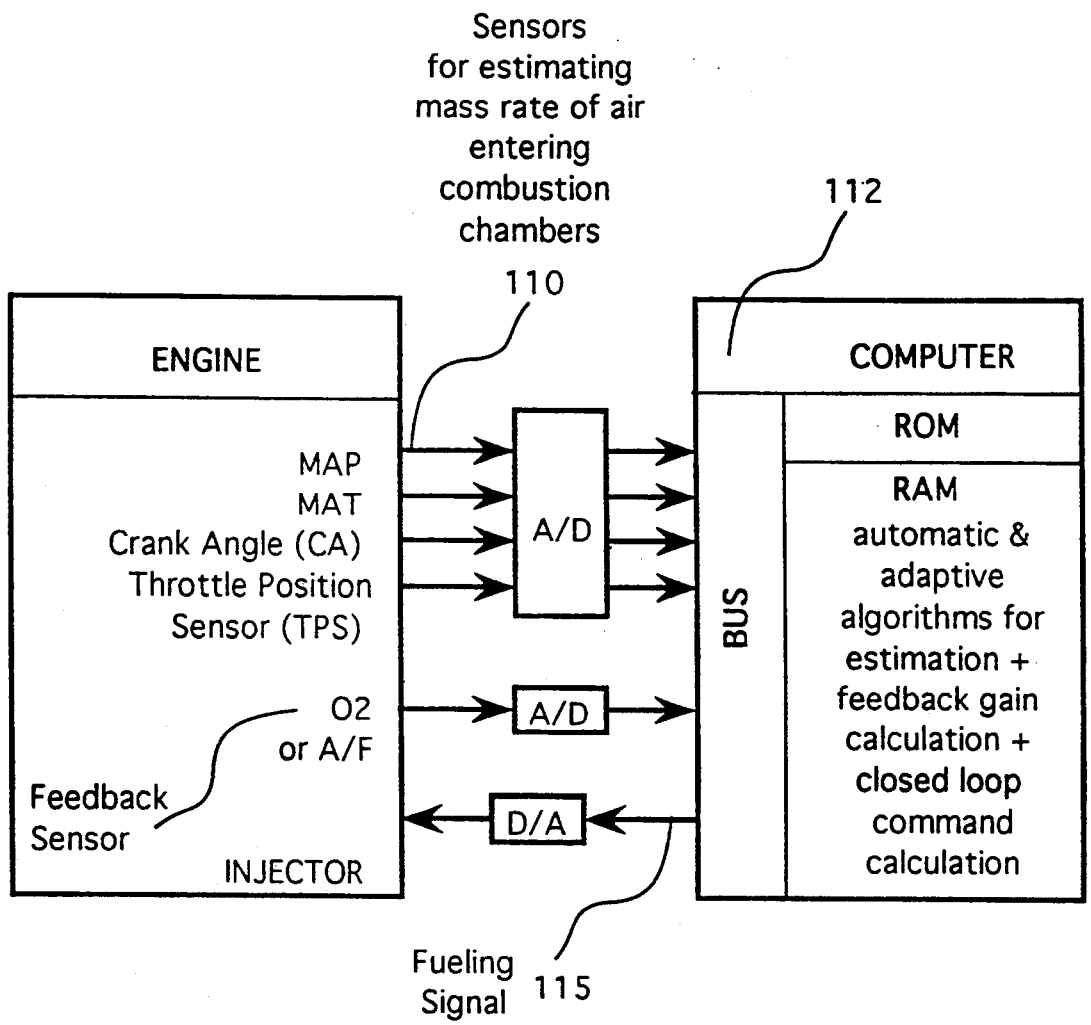
FIG. 7 is high level block diagram of a system to perform the invention hereof.
Figure 8:
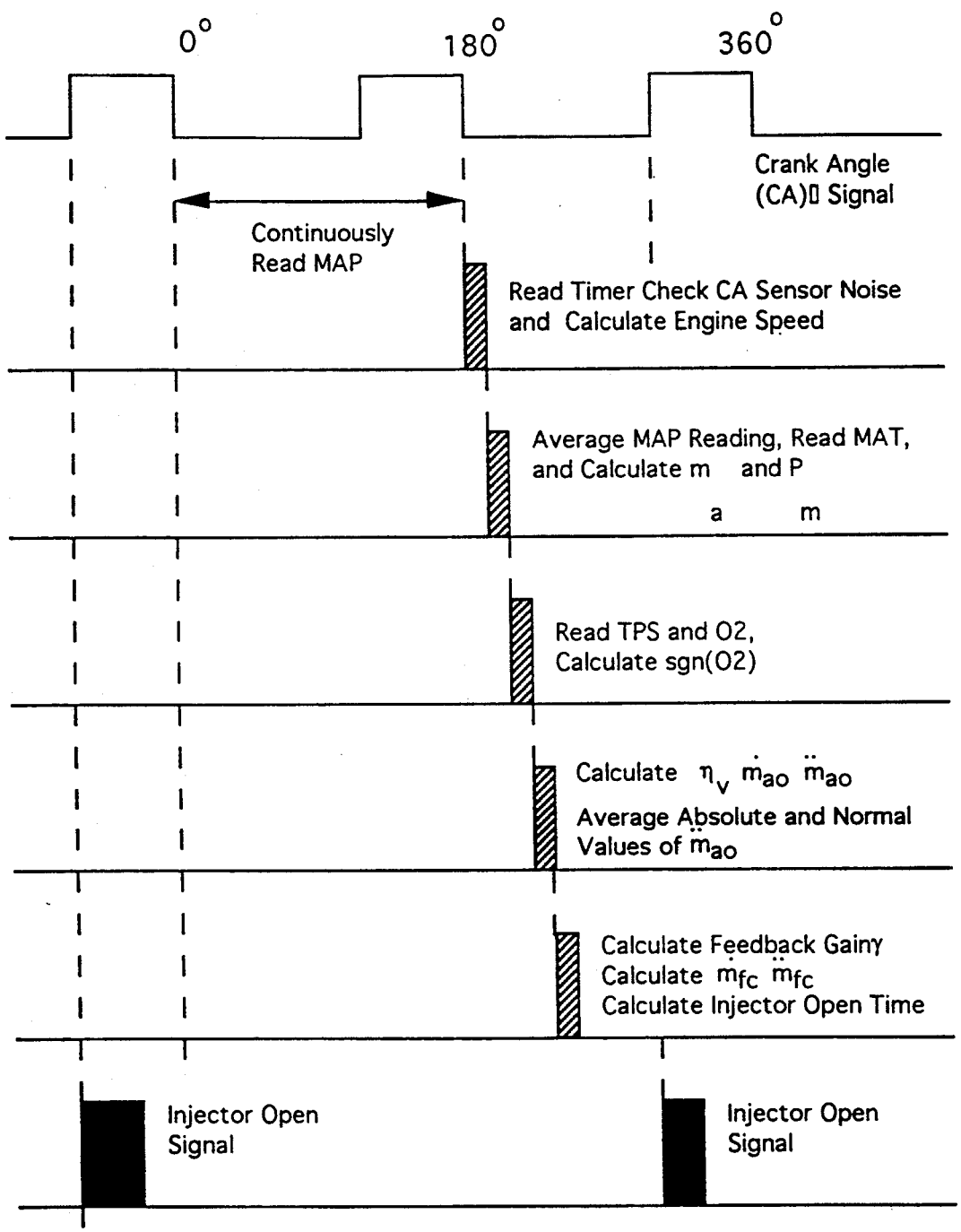
FIG. 8 is detailed block diagram the algorithm sequence and timing of a system to perform the invention hereof.
Figure 9A:
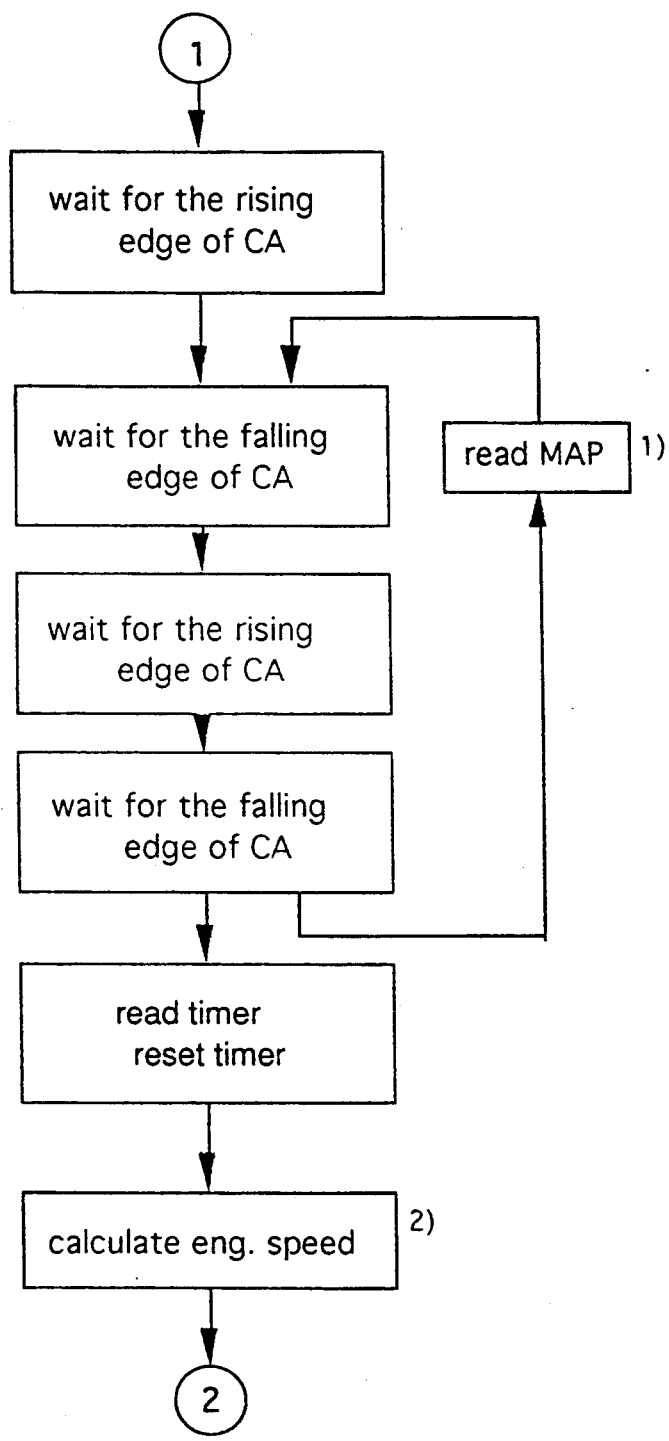
Figure 9B:
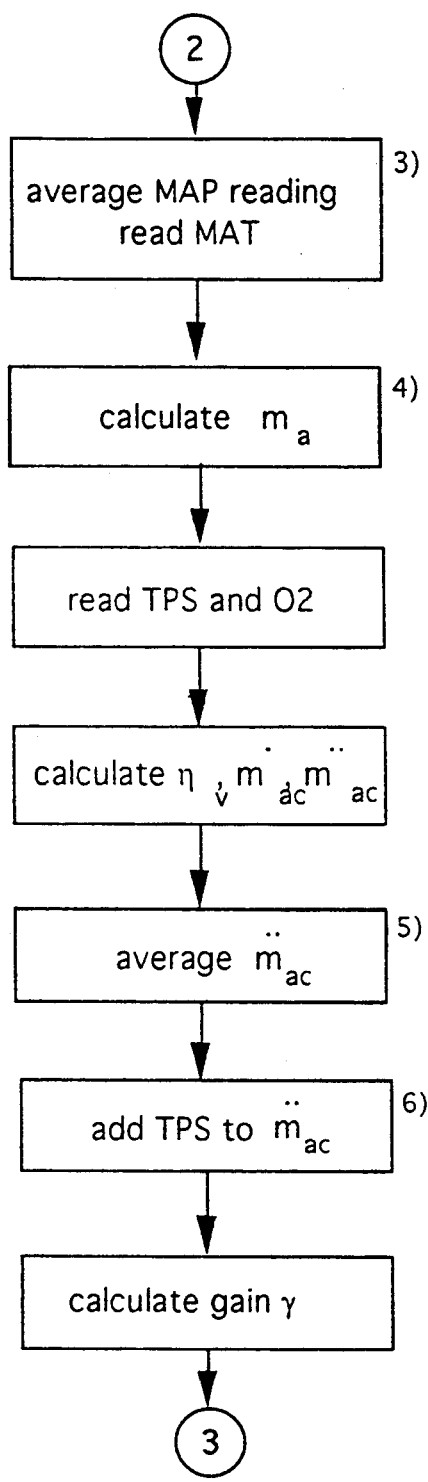
Figure 9C:
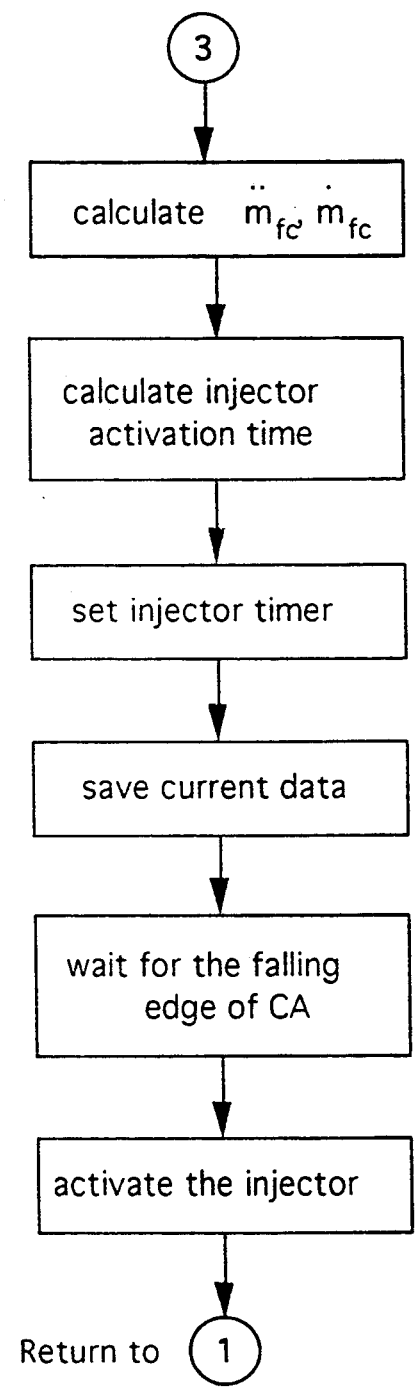

The automatic fuel injection control system of the subject invention can be implemented on IC engines in similar manners to known art discussed in FIGS. 4 and 6. Referring now to FIG. 7, a high level implementation diagram of the subject invention is shown. The diagram shows only the speed-density type implementation, but it should be noted that the mass flow meter type implementation is analogous. Set of sensors 110 that includes the MAP, MAT, crank angle, and throttle position sensors (TPS) provides measured values of intake manifold and engine states and conditions, which are fed through analog to digital converters and then into a computer 112 for processing. Feedback sensors 111 can be an oxygen sensor, air to fuel ratio sensor, or both and are also fed through analog to digital converters and then into a computer 112 for processing. A random access memory (RAM) 113 includes codes for the algorithm for processing, estimating, and calculating the mass rate of air $m_{ao}(t)$ entering combustion chambers, its rate of change $\dot{m}_{ao}(t)$, and the automatic control parameter $\gamma(t)$. RAM 113 also provides active storage for values received from sensors and other processing action. A read only memory (ROM) 114 provides storage for fixed parameters, and an output line 115 provides the fuel injection signal $m_{fc}(t)$.

Referring to FIGS. 8, 9, 9A, 9B and 9C, a more detailed diagram and flow charts, respectively, of the algorithms in the RAM, as well as their processing sequences and the timing with respect to the engine events or crank angle are shown. Note that the shown timing diagram and flow chart are for the simultaneous double fire (i.e., injectors fire every engine revolution) implementation, and that the sequential fire implementation (i.e., injectors fire every other engine revolution)

is also analogous. The crank angle (CA) sensor outputs a high signal every 180 degrees of engine rotation as shown. The top dead center (TDC) of an intake stroke is at the falling edge of the CA signal marked 0 degree in FIG. 8. A fuel injector open signal is initiated at the rising edge of the CA signal preceding the TDC. Between the TDC signal and the bottom dead center (BDC) signal which occurs at the next falling edge marked 180 degrees in FIG. 8, manifold absolute pressure (MAP) information is continuously read and its sum is stored for later processing; the reason for the continuous multiple reading is to smooth out the fluctuations in the manifold pressure due to induction process from other cylinders in the engine. Upon receiving the falling edge signal of the BDC, the computer reads its timer for the elapsed time between the current time and the time at which previous BDC occurred; this elapsed time is used to determine the engine speed. Then, the reading of the manifold temperature information and averaging of the MAP sensor signal is performed. Next, the throttle position sensor (TPS) and the oxygen sensor (O2) signals are read. Then, based based on these sensor output signals and processed informations, the volumetric efficiency $\eta_v$, the mass rate of air $m_{ao}(t)$ entering the combustion chamber, and its rate of change $\dot{m}_{ao}(t)$ are computed. The change in the mass rate of air $\dot{m}_{ao}(t)$ entering the combustion chamber is computed using the numerical differencing method, which can give large errors due to the electrical noise of various sensors, so the calculated values of the $\dot{m}_{ao}(t)$ term are averaged for 2 to 8 revolutions to smooth the unwanted sensor noise. Model differentiation of $m_{ao}(t)$ can also be employed to compute $\dot{m}_{ao}(t)$ and implemented in the similar manner. To compensate the potential time lag in the above averaging method, the TPS signal which leads the $\dot{m}_{ao}(t)$ in the time scale is used; the change in the TPS signal is added to the $\dot{m}_{ao}(t)$ calculations. In the next step, the feedback gain term $\gamma(t)$ is computed from the processed and calculated values of $m_{ao}(t)$, $\dot{m}_{ao}(t)$, TPS, and the fueling error parameter $\phi(t)$; therefore, the the feedback gain term $\gamma(t)$ contains all internal and external operating conditions of the IC engine and is automatically adapted to changing conditions. Finally, the fuel injection duration is computed and outputted to the fuel injectors.

FIG. 9—Flow Chart Comments 1,3) MAP sensor is read continuously for one-half of a revolution of the crank shaft and averaged to eliminate pressure fluctuations due to the induction process from other cylinders.

2) Engine speed is calculated from the crank angle rotation divided by the elapsed time, which is measured from counting pulses of a counter/timer chip on the computer.

4) $m_a$ (total air mass in the intake manifold) is calculated using the Ideal Gas law and the signals from the MAP and MAT sensors.

5&6) A single values of $m_{ao}(t)$ (the time rate of change of the mass air flow rate entering the cylinder) is calculated via numerical differencing. The absolute value of abs($\dot{m}_{ao}(t)$) used in feedback gain is averaged to smooth out noise. Normal or non-absolute values of $\dot{m}_{ao}(t)$ are also time-moving averaged. Throttle change is added to both averaging to compensate for the averaging time lag.

The automatic control system for IC engine fuel injection of the subject invention heretofore has assumed the implementation method of speed-density type and simultaneous double fire type. However, it should be noted that the subject invention can be applied to other types, including the mass air flow meter type and sequential injection type, by those skilled in the art without departing from the subject invention. Accordingly, the present invention is intended to embrace all such alternatives, modifications, and variances.

In addition, the automatic control system for IC engine fuel injection of the subject invention heretofore has assumed controlling the air to fuel ratio using the oxygen sensor as the feedback sensor, and controlling air to fuel ratio at the stoichiometric ratio. However, it should be noted that alternatives for feedback sensor and target air to fuel ratios other than the stoichiometric ratio are also possible, and this invention is intended to embrace all such alternatives which fall within the scope of the appended claims and not to be deemed limited thereby. Furthermore, the desired air to fuel ratio can be changed to other values quite easily, using the oxygen sensor. Referring to FIG. 5, the oxygen sensor does output different voltages for different air to fuel ratio. For example, for a rich bias control, instead of using the feedback control signal as a function of sgn[400−V(O2(t))], sgn[750−V(O2(t))] may be used. This is similar to the approach used in the conventional linear local fuel injection controllers to achieve a rich bias. For a lean bias, for example, sgn[75−V(O2(t))] may be used. In addition, the nonlinear global fuel injection control method, which is the subject of this invention, provides another means to achieve a rich or lean bias. For a rich bias control, the following feedback gain can be used:

$$\gamma(t) = \begin{cases} \alpha\gamma(t) \text{ if } V(O_2) \geq 400 \\ \gamma(t) \text{ if } V(O_2) < 400 \end{cases} \quad (28)$$

where $\alpha$ is a small positive constant less than 1. For a lean bias control, the following feedback gain can be used:

$$\gamma(t) = \begin{cases} \gamma(t) \text{ if } V(O_2) \geq 400 \\ \alpha\gamma(t) \text{ if } V(O_2) < 400 \end{cases} \quad (29)$$

Figure 10:
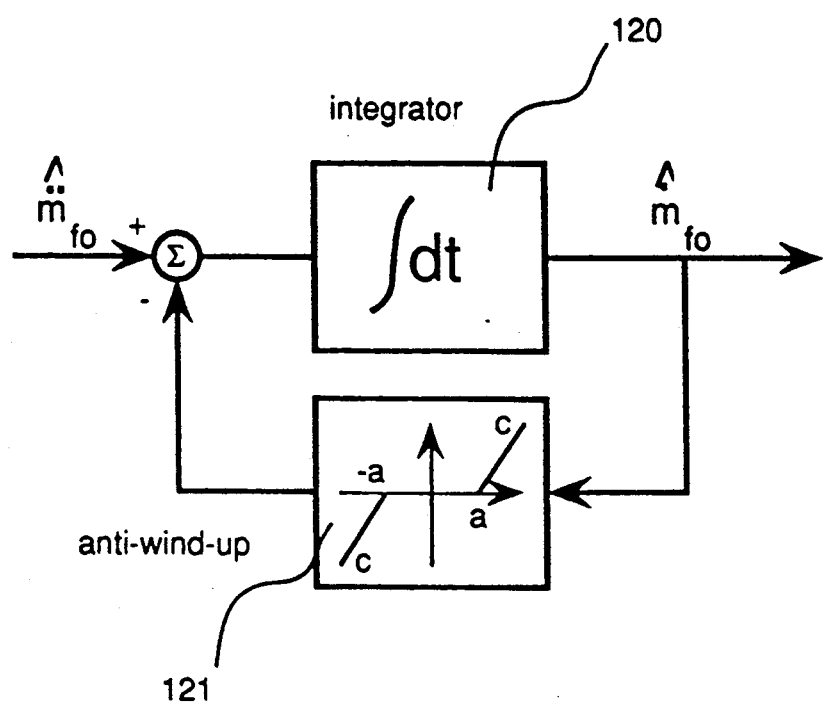
FIG. 10 is a high level block diagram of a prior a anti-wind-up mechanism for use in nonlinear fuel injection control system to perform the invention hereof.

A second method exists that can remedy the robustness problems associated with estimating the mass rate of fuel actually entering the combustion chamber $m_{fo}(t)$ for the controller disclosed by Cho and Hedrick. The most severe problem of the controller described by equations (14)–(16) is the open loop estimation using the numerical integration scheme in equation (14)–(15), which is susceptible to noise and errors. This problem can be ameliorated by the use of anti-wind-up and/or forgetting factor algorithms. One such algorithm is schematically illustrated in FIG. 10, where the integrator 120 is used in combination with a feedback element 121 which turns off the integral action, once certain value is reached. The digital implementation of this algorithm is given below:

if abs($m_{fo}(t)$)≦a, $m_{fo}(t) = m_{fo}(t-t_k) + t_k \times \dot{m}_{fo}(t)$ (30)

if abs($m_{fo}(t)$)>a,
$m_{fo}(t) = m_{fo}(t-t_k) + t_k \times [\dot{m}_{fo}(t) - c \times m_{fo}(t)]$ (31)

For further discrimination of drift errors due to parameter and modeling errors, the signal entering the anti-wind-up algorithm can be conditioned with a high pass or band pass filter.

It should be understood that the foregoing description is only illustrative of the subject invention. Various alternatives and modifications can be devised by those skilled in the art without departing from the invention. Accordingly, the present invention is intended to embrace all such alternatives, modifications, and variances which fall within the scope of the appended claims.

I claim:

1. A fuel injection system for an internal combustion engine comprising:
    at least one intake manifold sensor for sensing at least one ambient condition at the intake of an internal combustion engine which is indicative of the mass flow rate through the intake manifold;
    an exhaust sensor for sensing the oxygen content of the exhaust gases exiting the engine;
    at least one fuel injector which provides fuel to the engine;
    a controller coupled to said sensors and said fuel injector, said controller being responsive to sensing signals from said sensors in order to calculate and control the amount of fuel to be delivered to the engine at specific time intervals, the amount of fuel delivered calculated for each time interval being based substantially on the immediately preceding time interval calculation and the signals from said sensors.

2. A fuel injection system for an internal combustion engine as set forth in claim 1, wherein the portion of said calculation based on said signals from said sensors includes a best estimate of the rate of change in the mass flow rate exiting the intake manifold plus the product of a feedback control gain and the output of the exhaust sensor, multiplied by the time interval and divided by a desired air to fuel ratio.

3. A fuel injection system for an internal combustion engine comprising:
    at least one intake manifold sensor for sensing at least one ambient condition at the intake of an internal combustion engine which is indicative of the rate of air flow through the intake manifold;
    an exhaust sensor for sensing the oxygen content of exhaust gases exiting the internal combustion engine, the exhaust sensor providing a voltage output $V(O_2)$;
    at least one fuel injector which provides fuel to the engine;
    a controller coupled to said sensors and said fuel injector, said controller being responsive to sensing signals from said sensors in order to calculate the amount of fuel to be delivered to the engine at specific time intervals and to control said fuel injector in accordance with the results of the calculation, the calculation being substantially in accordance with the equation $$m_{fc}(t) = m_{fc}(t - t_k) + t_k \frac{1}{\beta} [m_{ao}(t) + \gamma(t)\text{sgn}[400 - V(O_2(t))]]$$

where $$\gamma(t) > \text{abs}(\dot{\phi}(t)) + \text{abs}(\mu(t)\dot{m}_{ao}(t)) + \mu(t)\text{abs}(\dot{\mu}(t)m_{ao}(t))$$

and where $$(\dot{\ }) = \frac{d(\ )}{dt} = \text{first time derivative}$$

$(\ddot{\ }) =$ second time derivative of $(\ )$
$(\hat{\ }) =$ model or best estimate of $(\ )$
abs $(\ ) =$ absolute value of $(\ )$
$\beta =$ desired air to fuel ratio
$\phi =$ modeling error in fuel delivery dynamics
$\gamma =$ feedback gain, positive, adjusts automatically to external and internal conditions
$\mu =$ modeling error for $m_{ao}$
$m_{ao} =$ mass rate of air exiting intake manifold and entering combustion chamber
$m_{fc} =$ commanded mass rate of fuel $$\text{sgn}(\ ) = \begin{cases} -1 \text{ if } (\ ) \geq 0 \\ 1 \text{ if } (\ ) < 0 \end{cases}$$

$t =$ time
$t_k =$ the time interval
$V(O_2) =$ voltage output of oxygen sensor in millivolts.

4. A method for controlling the injection of fuel in an internal combustion engine comprising the steps of:
    measuring at least one ambient condition within the intake manifold of the engine which is indicative of the rate of air flow through the manifold;
    measuring the oxygen exiting the engine and producing a voltage output indicative of the oxygen content of the exhaust gases from the engine;
    calculating the amount of fuel to be delivered to the engine at specific time intervals substantially according to the equation $$m_{fc}(t) = m_{fc}(t - t_k) + t_k \frac{1}{\beta} [m_{ao}(t) + \gamma(t)\text{sgn}[400 - V(O_2(t))]]$$

where $$\gamma(t) > \text{abs}(\dot{\phi}(t)) + \text{abs}(\mu(t)\dot{m}_{ao}(t)) + \mu(t)\text{abs}(\dot{\mu}(t)m_{ao}(t))$$

and where $$(\dot{\ }) = \frac{d(\ )}{dt} = \text{first time derivative}$$

$(\ddot{\ }) =$ second time derivative of $(\ )$
$(\hat{\ }) =$ model or best estimate of $(\ )$
abs $(\ ) =$ absolute value of $(\ )$
$\beta =$ desired air to fuel ratio
$\phi =$ modeling error in fuel delivery dynamics
$\gamma =$ feedback gain, positive, adjusts automatically to external and internal conditions
$\mu =$ modeling error for $m_{ao}$
$m_{ao} =$ mass rate of air exiting intake manifold and entering combustion chamber
$m_{fc} =$ commanded mass rate of fuel $$\text{sgn}(\ ) = \begin{cases} -1 \text{ if } (\ ) \geq 0 \\ 1 \text{ if } (\ ) < 0 \end{cases}$$

$t =$ time
$t_k =$ the time interval
$V(O_2) =$ voltage output of oxygen sensor in millivolts, and;
delivering the calculated amount of fuel to the engine.

* * * * *